No. 695,941. Patented Mar. 25, 1902.
H. J. MERTZ.
NUT LOCK.
(Application filed Aug. 2, 1901.)
(No Model.)
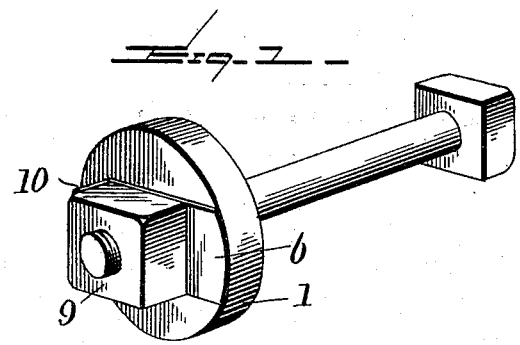
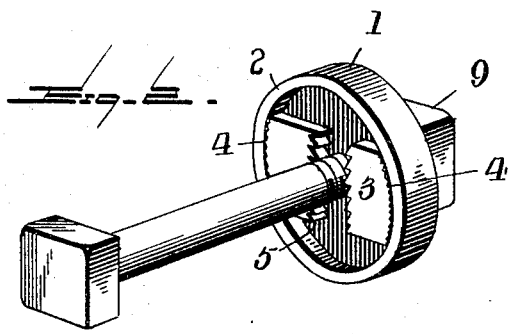
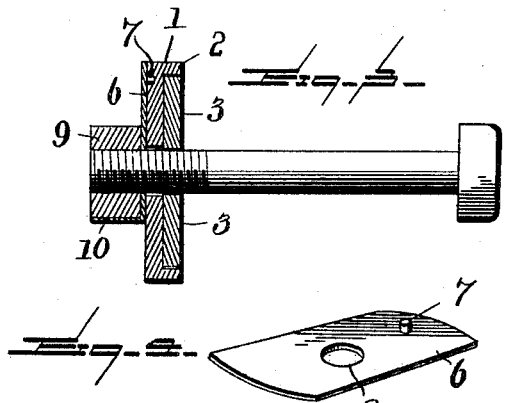
WITNESSES:
INVENTOR
Henry J. Mertz.
BY
Attorney

UNITED STATES PATENT OFFICE.

HENRY JOHN MERTZ, OF BEARDSTOWN, ILLINOIS.

NUT-LOCK.

SPECIFICATION forming part of Letters Patent No. 695,941, dated March 25, 1902.

Application filed August 2, 1901. Serial No. 70,576. (No model.)

*To all whom it may concern:*

Be it known that I, HENRY JOHN MERTZ, a citizen of the United States, residing at Beardstown, in the county of Cass and State of Illinois, have invented new and useful Improvements in Nut and Bolt Locks, of which the following is a specification.

My invention has relation to nut and bolt locks; and it consists in the novel construction and arrangement of its parts, as hereinafter described.

The object of my invention is to provide a nut and bolt lock adapted to firmly secure the nut and bolt together.

In the accompanying drawings, Figure 1 is a perspective view of a nut and bolt, showing the locking device attached thereto. Fig. 2 is a perspective view of the nut and bolt, showing the under side of the locking device. Fig. 3 is a side elevation of a bolt, showing the nut and locking device in section; and Fig. 4 is a perspective view of the plate used in connection with the locking device.

The locking device consists of the disk 1, having on its under side an annular flange 2, which forms a recess on the under side of the said disk. The segments 3 are adapted to be located in the recess of the disk 1, formed by the flange 2. The outer edges of the segments 3 are provided with serrations 4, which are adapted to engage the inner surface of the flange 2. The disk 1 is provided with a central perforation through which the bolt passes. The inner edges of the segments 3 are provided with saw-teeth projections 5, said projections being adapted to engage the sides of the bolt, as shown in Figs. 2 and 3. The plate 6 is provided with a lug 7, which is adapted to enter a recess on the outer face of the disk 1, said plate having a perforation 8, adapted to register with the central perforation of the disk 1. The bolt also passes through the perforation 8 of the plate 6.

In assembling the parts the disk 1 is placed over the bolt, and the nut 9 is screwed in place on the thread of the bolt. When it is sufficiently tightened, the end of the plate 6 is bent up, as at 10, against the side of the nut, thus preventing the same from becoming loosened. The saw-tooth projections 5 of the segments 3 engage the bolt, and the serrations 4 engage the disk 1. Thus the said disk is prevented from turning or moving with relation to the bolt.

Having described my invention, what I claim as new, and desire to secure by Letters Patent, is—

1. A nut and bolt lock consisting of a disk having a perforation adapted to receive the bolt, and an annular flange located on said disk, a segment having on one edge serrations adapted to engage said flange and on its other edge saw-tooth projections adapted to engage the bolt, and a means for securing the nut to the disk.

2. A nut and bolt lock consisting of a disk having a central perforation adapted to receive the bolt, and an annular flange located on the disk, segments having at their outer edges serrations adapted to engage the flange and at their inner edges saw-tooth projections adapted to engage the bolt, a plate having a perforation adapted to receive the bolt, said plate having a lug adapted to enter a recess on the outer face of the disk, the end of the said plate adapted to be bent at an angle along the side of the nut.

In testimony whereof I affix my signature in presence of two witnesses.

HENRY JOHN MERTZ.

Witnesses:
 GEO. SUTKEMYER,
 HENRY STEPHENS.